United States Patent
Kitagawa et al.

(10) Patent No.: US 11,091,622 B2
(45) Date of Patent: Aug. 17, 2021

(54) SEALING MATERIAL

(71) Applicant: NOK CORPORATION, Tokyo (JP)

(72) Inventors: Asahi Kitagawa, Ibaraki (JP); Yuichi Suzuki, Ibaraki (JP)

(73) Assignee: NOK Corporation, Tokyo (JP)

( * ) Notice: Subject to any disclaimer, the term of this patent is extended or adjusted under 35 U.S.C. 154(b) by 147 days.

(21) Appl. No.: 16/087,179

(22) PCT Filed: Feb. 8, 2018

(86) PCT No.: PCT/JP2018/004489
§ 371 (c)(1),
(2) Date: Sep. 21, 2018

(87) PCT Pub. No.: WO2018/151016
PCT Pub. Date: Aug. 23, 2018

(65) Prior Publication Data
US 2019/0062544 A1 Feb. 28, 2019

(30) Foreign Application Priority Data

Feb. 16, 2017 (JP) .................................. 2017-026960
Feb. 16, 2017 (JP) ............................. JP2017-026959

(51) Int. Cl.
*C08L 27/18* (2006.01)
*C08K 3/22* (2006.01)
(Continued)

(52) U.S. Cl.
CPC .............. *C08L 27/18* (2013.01); *C08K 3/08* (2013.01); *C08K 3/22* (2013.01); *C09J 127/18* (2013.01);
(Continued)

(58) Field of Classification Search
CPC .............. F16J 15/16; C08K 2003/2289; C08K 2003/082; C08K 3/08; C08K 3/22;
(Continued)

(56) References Cited

U.S. PATENT DOCUMENTS 3,460,968 A * 8/1969 Bate ..................... G11B 5/72
428/458
5,224,266 A * 7/1993 Graft ..................... B22D 19/08
29/458

(Continued)

FOREIGN PATENT DOCUMENTS

CN 102875941 A 1/2013
JP H10-95889 A 4/1998
(Continued)

OTHER PUBLICATIONS

Peterson (<u>Investigation of Solid Film Lubricants and Sliding Contacts at Temperatures Above 1000° F.</u>, Aircraft Nuclear Propulsion Deparatment</i>, General Electric, Feb. 1958, pp. 5-7). https://play.google.com/books/reader?id=C5M4aH2fWZMC&hl=en&pg=GBS.PP1.*

(Continued)

*Primary Examiner* — Brieann R Johnston
(74) *Attorney, Agent, or Firm* — The Marbury Law Group, PLLC

(57) ABSTRACT

Provided is a sealing material having abrasion resistance usable for even construction machinery operated under severe conditions while keeping mechanical strength thereof. The sealing material includes a fluorinated resin composition containing the following materials (1) and (2), and further containing the following material (3) or (4). The materials are: (1) fluorinated resin, (2) bronze, (3) tricobalt tetraoxide, (4) a composite metal oxide containing cobalt and aluminum, and further containing at least one of metals selected from the group of chromium, titanium, magnesium, (Continued)

calcium, and lithium. Preferably, the fluorinated resin is polytetrafluoroethylene. Further, the sealing material is usable for construction machinery.

6 Claims, 2 Drawing Sheets

(51) Int. Cl.
    *C08K 3/08*     (2006.01)
    *F16J 15/20*     (2006.01)
    *F16J 15/3284*     (2016.01)
    *C08K 3/013*     (2018.01)
    *C09J 127/18*     (2006.01)

(52) U.S. Cl.
    CPC .......... *F16J 15/20* (2013.01); *F16J 15/3284* (2013.01); *C08K 3/013* (2018.01); *C08K 2003/085* (2013.01); *C08K 2003/2203* (2013.01); *C08K 2003/2206* (2013.01); *C08K 2003/2217* (2013.01); *C08K 2003/2227* (2013.01); *C08K 2003/2237* (2013.01); *C08K 2003/2248* (2013.01); *C08K 2003/2251* (2013.01); *C08K 2003/2289* (2013.01); *C08K 2201/003* (2013.01); *C08K 2201/014* (2013.01)

(58) Field of Classification Search
    CPC .......... C09K 3/10; C09K 3/1009; C08L 27/12; C08L 27/18
    See application file for complete search history.

(56) References Cited

U.S. PATENT DOCUMENTS

| | | | | |
|---|---|---|---|---|
| 7,985,703 B2 * | 7/2011 | Freling | ..................... | C23C 4/04 427/447 |
| 2002/0037234 A1 * | 3/2002 | Nadkarni | ................. | C22C 5/06 420/501 |
| 2003/0189295 A1 * | 10/2003 | Ota | ........................ | F16J 15/126 277/500 |
| 2015/0267816 A1 * | 9/2015 | Boskovski | ........... | F16J 15/3208 277/553 |
| 2020/0056030 A1 * | 2/2020 | Thurnherr | ................. | F16J 9/28 |

FOREIGN PATENT DOCUMENTS

| | | | | |
|---|---|---|---|---|
| JP | 2003-336744 A | 11/2003 | | |
| JP | 2010-138404 A | 6/2010 | | |
| JP | 4894107 B | 1/2012 | | |
| KR | 20130058623 A | * 6/2013 | .......... | C10M 169/04 |

OTHER PUBLICATIONS

Google patents translation of KR 20130058623 (2013, 7 pages).*
International search report and Written Opinion received in connection with international application No. PCT/JP2018/004489, dated Apr. 3, 2018.
English translation of the International search report received in connection with international application No. PCT/JP2018/004489, dated Apr. 3, 2018.
Extended European Search Report for related European Application No. 18753892.1, dated Nov. 17, 2020.

* cited by examiner

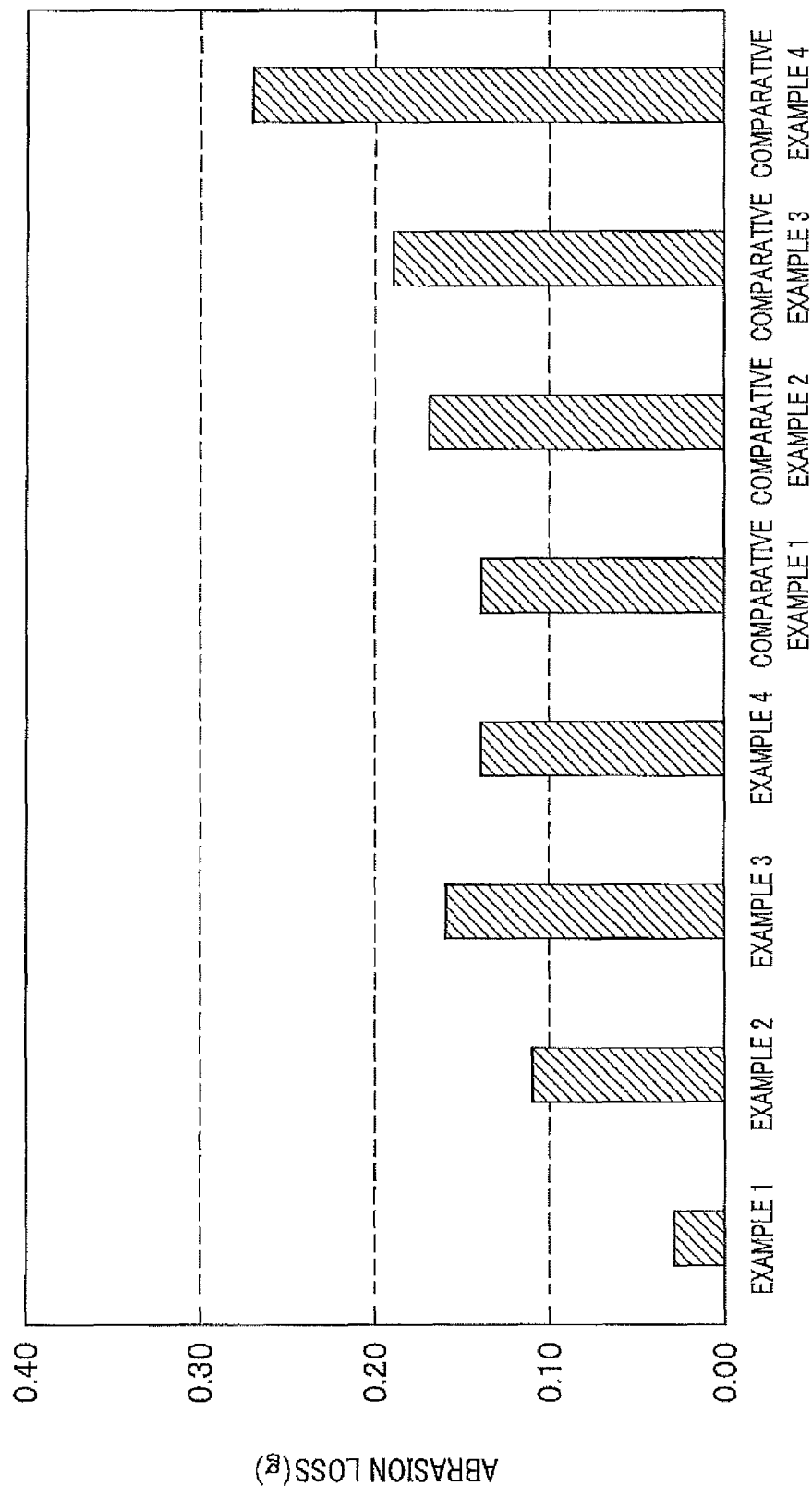

SEALING MATERIAL

RELATED APPLICATIONS

This application is a national phase entry of international patent application PCT/JP2018/004489 filed Feb. 8, 2018, which claims benefit of priority to Japanese Application Serial No. 2017-026959, filed Feb. 16, 2017, and to Japanese Application Serial No. 2017-026960, also filed Feb. 16, 2017, the entire disclosures of which are incorporated herein by reference in their entireties.

TECHNICAL FIELD

The present invention relates to a sealing material.

BACKGROUND ART

A hydraulic breaker is attached to a hydraulic shovel as an attachment and used for demolition of a pavement surface and a concrete structure, cobbing of stones and drilling of bedrock by continuously striking those substances with a chisel (i.e., only a rod). FIG. 1 shows a view in which a hydraulic breaker 2 is attached to a hydraulic shovel 1 as an attachment.

A hydraulic breaker 2 is provided with a cylinder and a piston. The piston and cylinder relatively reciprocate at high speed, which makes a chisel attached to a tip of the piston reciprocate at high speed. A seal that seals oil or the like is provided at an annular gap between the piston and the cylinder inside the hydraulic breaker 2.

FIG. 2 shows a schematic diagram indicating an internal structure of the hydraulic breaker 2. The hydraulic breaker 2 includes a cylindrical cylinder 10 having an axial hole, and a piston 11 inserted in the axial hole of the cylinder 10 so that a clearance (i.e., an extremely small gap) exists against an inner circumferential surface of the axial hole. A chisel 12 for crushing concrete and bedrock is attached to a tip of the piston 11.

A backhead with a bottomed cylindrical shape is coaxially fixed at a back end side of the cylinder 10. An outlet for oil and an inlet valve for gas are incorporated in the backhead, and nitrogen gas is filled inside the backhead.

A first sealing system 4 and a second sealing system 3 are provided respectively at a backend side and a tip end side to seal an annular gap between an axial hole provided in the cylinder 10 and the piston 11 of the hydraulic breaker 2, so that seals are provided. Herein, oil is sealed between the first sealing system 4 and the second sealing system 3. The first sealing system 4 plays a role for preventing leakage of not only oil but also the above described nitrogen gas. Further, the second sealing system 3 plays a role for preventing not only leakage of oil but also intrusion of dusts from the outside. A seal retainer 5 is provided for fixing the seal in the first sealing system 4.

The hydraulic breaker 2 thus configured as described above may use oil pressure and gas pressure to cause reciprocating movement 6 of a piston 11 as well as a chisel 12 with a pile shape in an axial direction at high speed. Hereby, the hydraulic breaker 2 may crush a target to be broken (i.e., concrete and bedrock) by striking a tip of the chisel 12 on the object to be broken.

Here, seals provided at the first sealing system 4 and the second sealing system 3 inside the hydraulic breaker 2 thus described above are exposed to vigorous reciprocation with highly pressured and speeded motion in a severely dusty environment. Thus, damage and abrasion of the seals are remarkably severe.

Conventionally, a fluorinated resin composition including bronze and carbon black, etc. has been used as a sealing material of usual construction machinery. Such a fluorinated resin composition has sufficient strength and abrasion resistance as long as the composition is applied to usual construction machinery. However, when a sealing material is applied to a hydraulic breaker as mentioned above, such a sealing material is to be exposed to extremely severe conditions (i.e., highly pressured and speeded operation conditions) compared to a sealing material applied to the usual construction machinery. Therefore, more improvement in the abrasion resistance has been demanded.

For example, Patent Document 1 discloses a sealing device (i.e., a piston packing) used for a hydraulic driving cylinder of construction machinery or the like. Such a sealing device has a two-layered annular structure configured by an annular member contacting an outer circumferential surface of the piston (i.e., an inner circumferential member), and an annular member contacting an inner circumferential surface of the cylinder (i.e., an outer circumferential member). Further, one of the annular members is an annular member made of polytetrafluoroethylene resin containing filler that includes a component harder than polytetrafluoroethylene. The other is an annular member made of rubber.

DOCUMENTS OF PRIOR ART

Patent Documents

Patent Document 1: Japanese Patent Publication No. 4894107

SUMMARY OF INVENTION

Problems to be Solved by Invention

However, it is not construed that the sealing device described in Patent Document 1 has sufficient abrasion resistance to meet the above demand, and therefore, enough room for improving the property still remains.

The present invention has been made in view of the above described circumstance. Therefore, an object of the present invention is to provide a sealing material that has abrasion resistance usable for even construction machinery operated under severe conditions while keeping mechanical strength thereof.

Means for Solving Problems

The present inventors have keenly investigated fluorinated resin serving as base resin via focusing on a component that contains bronze and further improves abrasion resistance thereof. This investigation resulted in findings that a cobalt based specific metal oxide or a specific composite oxide containing cobalt and aluminum reciprocation has an excellent improving effect of abrasion resistance while keeping mechanical strength thereof. Eventually, the inventors have reached the present invention.

That is, the present invention is a sealing material including a fluorinated resin composition that contains the following materials (1) and (2), and further contains the following material (3) or (4).

(1) fluorinated resin, (2) bronze, (3) tricobalt tetraoxide, and (4) a composite metal oxide containing cobalt and aluminum, and further containing at least one of metals selected from the group of chromium, titanium, magnesium, calcium and lithium.

Further, preferably the fluorinated resin is polytetrafluoroethylene. Moreover, a sealing material of the present invention is usable for construction machinery.

Hereinafter, the term of a "composite metal oxide containing cobalt and aluminum, and further containing at least one of metals selected from the group of chromium, titanium, magnesium, calcium and lithium" will be described as a "cobalt-aluminum based composite metal oxide".

Effect of Invention

A sealing material of the present invention has abrasion resistance usable even for construction machinery operated under severe conditions while keeping mechanical strength thereof.

BRIEF DESCRIPTION OF DRAWINGS

FIG. 3 is a graphic diagram showing abrasion losses of Examples and Comparative Examples.

EMBODIMENTS FOR CARRYING OUT INVENTION

Figure 1:
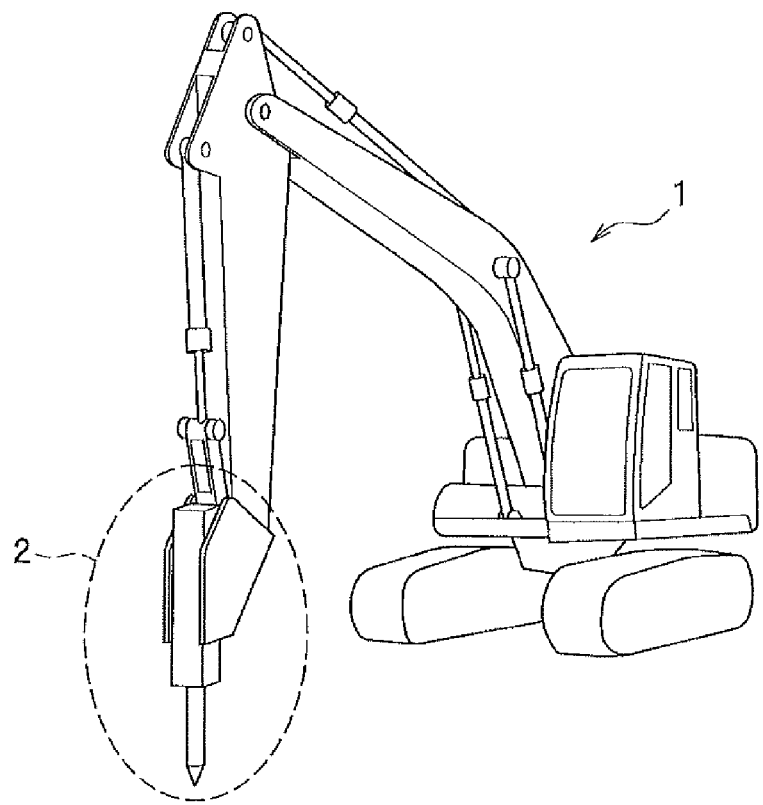
FIG. 1 is a schematic view showing a hydraulic shovel attached with a hydraulic breaker.
Figure 2:
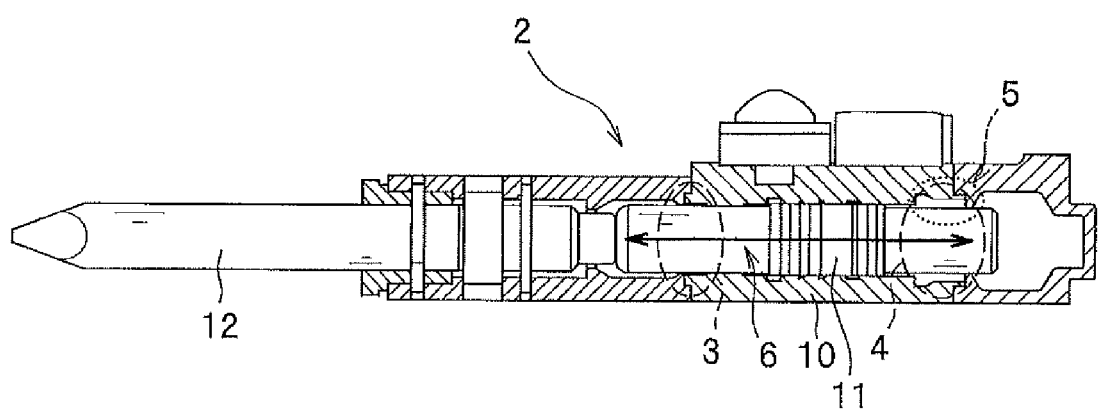
FIG. 2 is a schematic diagram of an internal structure of the hydraulic breaker.

Hereinafter, embodiments of the present invention will be described in detail. However, the scope of the present invention is not limited to the embodiments described below.

A sealing material of the present invention includes fluorinated resin as base resin, and further contains bronze, and tricobalt tetraoxide or a cobalt-aluminum based composite metal oxide.

The fluorinated resin is excellent in heat resistance, abrasion resistance, self-lubrication and mechanical strength, and has basic properties needed as a sealing material. The fluorinated resin includes, for example, polytetrafluoroethylene (PTFE), tetafluoroethylene-perfluoroalkylvinyl ether copolymer (PFA), tetrafluoroethylene-hexafluoropropylene copolymer (FEP), tetrafluoroethylene-ethylene copolymer (ETFE), polyvinylidene fluoride (PVDF), polychloro-trifluoroethylene (PCTFE), and chlorotrifluoroethylene-ethylene copolymer (ECTFE) or the like. Among those materials, preferable ones are polytetrafluoroethylene, tetrafluoroethylene-perfluoroalkylvinyl ether copolymer, tetrafluoroethylene-hexafluoropropylene copolymer from the viewpoint of better heat resistance and self-lubrication, and the most preferable one is polytetrafluoroethylene.

Bronze is an alloy of copper and tin, and referred to as "seido" in Japanese. Excellent malleability of bronze allows fluorinated resin to have abrasion resistance, sliding properties and heat resistance when fine particles of bronze are added to the fluorinated resin. Preferably bronze is added to fluorinated resin at 10-70 mass %, more preferably 30-50 mass %. Here, bronze is added as fine particles. The fine particles of bronze have a mean particle diameter of preferably 5-80 µm, more preferably 20-60 µm. Note, the mean particle diameter may be measured by a laser diffraction particle distribution analyzer.

The present inventors have developed investigation focusing on an additive made of metal oxide based fine particles which enable improvement in the abrasion resistance while keeping the mechanical strength of a composition of fluorinated resin and bronze when those fine particles are added to the composition. As a result, the inventors found out that tricobalt tetraoxide and a cobalt-aluminum based composite metal oxide exert an excellent effect of improving the abrasion resistance. Herein, tricobalt tetraoxide and the cobalt-aluminum based composite metal oxide may be added to the composition individually, or in combination.

Tricobalt tetraoxide is a mixed valence compound including both bivalent cobalt (II) and trivalent cobalt (III). It is assumed that dispersion of tricobalt tetraoxide fine particles together with bronze fine particles in the fluorinated resin contributes to improvement in the abrasion resistance and sliding properties. Tricobalt tetraoxide is preferably added to the fluorinated resin at 0.1-5.0 mass %, more preferably 0.5-2.0 mass %. Herein, tricobalt tetraoxide is added as fine particles. The fine particles of tricobalt tetraoxide preferably have a mean particle diameter of 0.1-10 µm.

The cobalt-aluminum based composite metal oxide is a composite metal oxide containing cobalt and aluminum as essential metal elements, and further containing at least one of metal elements selected from the group of chromium, titanium, magnesium, calcium and lithium. It is assumed that dispersion of the metal oxide fine particles together with the bronze fine particles in the fluorinated resin contributes to improvement in the abrasion resistance and sliding properties. Herein, the cobalt-aluminum based composite metal oxide is preferably added to the fluorinated resin at 0.1-5.0 mass %, more preferably 0.5-2.0 mass %. Here, the cobalt-aluminum based composite metal oxide is added as fine particles. The fine particles of the cobalt-aluminum based composite metal oxide preferably have a mean particle diameter of 0.1-10 µm.

A method for preparing a fluorinated resin composition performed through addition of bronze fine particles and tricobalt tetraoxide fine particles to the fluorinated resin, or through addition of bronze fine particles and fine particles of the cobalt-aluminum based composite metal oxide to the fluorinated resin is not specifically limited. A known mixing method may be applied to the preparation method. Further, various types of conventionally known additives may be appropriately blended to the fluorinated resin composition as necessary, in which the additives include an inorganic filler, an organic filler, a dispersing agent, an antioxidant, and a heat stabilizer, in the range without damaging the object of the present invention.

A method for molding the fluorinated resin composition containing bronze and tricobalt tetraoxide, or bronze and the cobalt-aluminum based composite metal oxide in a seal shape is not specifically limited. A known molding method may be applied to the fluorinated resin composition.

EXAMPLES

Hereinafter, the present invention will be described more specifically referring to Examples. However, the present invention is not limited to those Examples. Raw materials used in Examples and Comparative Examples are described as follows.

(1) Polytetrafluoroethylene: AGC Chemicals Co., Ltd., Fuluon G-163.

(2) Bronze: Fukuda Metal Foil & Powder Co., Ltd., Bro-At-200, mean particle diameter: 35 µm.

(3) Additives:
(i) Tricobalt Tetraoxide: ISE CHEMICALS CORPORATION, tricobalt tetraoxide.
(ii) $CoAl_2O_4/Co\ (Al, Cr)_2O_4$: Ferro Corporation, PS22-5095PK, containing a small amount of Ti, Mg and Ca.
(iii) $CoAl_2O_4/Li_2O/TiO_2$: Tokan Material Technology Co., Ltd., 42-211A.
(iv) $Co\ (Al, Cr)_2O_4$: Tokan Material Technology Co., Ltd., 42-204A.
(v) $CoAl_2O_4$: Tokan Material Technology Co., Ltd., 42-250A.
(vi) $CoCO_3$: NIHON KAGAKU SANGYO CO., LTD., cobalt carbonate.
(vii) $Al_2O_3$: Sumitomo Chemical Co., Ltd., AL-41-01
(viii) Carbon Black: Mitsubishi Chemical Corporation, #20.

Examples 1-4 and Comparative Examples 1-4

Various types of powdery mixtures were prepared by mixing various types of powdery components listed in Table 1 via using a Henschel mixer at the rate (mass %) of polytetrafluoroethylene/bronze/additive=59.5/40.0/0.5. The resulting powdery mixtures thus obtained were compression-molded by a 100t press machine (i.e., a pressure of 69 Mpa, a holding time of 135 sec). Then, the compressed mixtures were fired at 375° C. for 3.0 hr, thereby to produce sheets (i.e., a thickness of 2 mm) of the various types of fluorinated resin compositions.

The sheets of fluorinated resin compositions thus produced were evaluated about the following items below.
(Tensile Strength and Breaking Elongation)
The tensile strength and the breaking elongation of each sheet were measured following JIS K 6891: 1995.
(Abrasion Loss)
The abrasion loss of each sheet was measured following JIS K 7218: 1986.
Surface Pressure: 6 Mpa, circumferential speed: 2 m/s, temperature: R. T., test time: 8 hr, opposite material: carbon steel S45C (ten-points average roughness of the surface Rz: 1.5 μm)+chromium plating, non-lubrication.

Table 1 shows results of the evaluation. FIG. 3 is a graphic diagram showing abrasion losses of Examples 1-4 and Comparative Examples 1-4 listed in Table 1.

In Comparative Example 4, the fluorinated resin composition corresponded to a sealing material actually used for construction machinery. Results of Examples 1-4 and Comparative Examples 1-4 showed that addition of metal compounds tended to decrease an abrasion loss and improve abrasion resistance. When comparing results among the metal compounds, as shown in Comparative Example 3, addition of the metal oxide of aluminum alone indicated a slightly inferior improvement effect of the abrasion resistance.

Further, as shown in Comparative Example 2, although a cobalt metal was used, addition of cobalt carbonate decreased the mechanical strength. Herein, it was construed that decomposition/decarboxylation of cobalt carbonate generated a lot of voids inside the material, thereby insufficiently contributing to maintenance of the mechanical strength. Moreover, addition of $CoAl_2O_4$ in Comparative Example 1 showed improvement in the abrasion resistance, but it also showed a decrease in the mechanical strength.

On the contrary, it was confirmed that in Examples 2-4, addition of cobalt-aluminum based composite metal oxides enables improvement in the abrasion resistance while keeping the mechanical strength. Further, as shown in Example 1, it was confirmed that addition of tricobalt tetraoxide exerts the specifically great improvement effect of the abrasion resistance while keeping the mechanical strength.

DESCRIPTION OF REFERENCE NUMERALS

1: Hydraulic Shovel
2: Hydraulic Breaker

The invention claimed is:
1. A sealing material comprised of a fluorinated resin composition containing the following materials (1), (2), and (3),
   (1) fluorinated resin,
   (2) bronze,
   (3) tricobalt tetraoxide,
   wherein the tricobalt tetraoxide has a mean particle diameter of from 0.1 μm to 10 μm both inclusive.
2. The sealing material described in claim 1, wherein the fluorinated resin is polytetrafluoroethylene.
3. The sealing material described in claim 1, wherein the sealing material is usable for construction machinery.
4. A sealing material comprised of a fluorinated resin composition containing the following materials (1), (2), and (3),

TABLE 1

| | Material Composition | | | | | Physical Properties | | |
| --- | --- | --- | --- | --- | --- | --- | --- | --- |
| | | | Additive | | | Tensile | Breaking | Abrasion |
| | Base Polymer | Filler | Compound | Contained Metal Element | Mean Particle Diameter (·m) | Strength (Mpa) | Elongation (%) | Loss (g) |
| Example 1 | Polytetrafluoroethylene | Bronze | Co3O4 | Co | 0.9 | 26 | 260 | 0.03 |
| Example 2 | | | CoAl2O4/Co (Al, Cr)2O4 | Co, Al, Cr, Ti, Mg, Ca | 1.4 | 26 | 280 | 0.11 |
| Example 3 | | | CoAl2O4/Li2O/TiO2 | Co, Al, Li, Ti | 3.3 | 26 | 270 | 0.16 |
| Example 4 | | | Co(Al, Cr)2O4 | Co, Al, Cr | 0.8 | 26 | 270 | 0.14 |
| Comparative Example 1 | | | CoAl2O4 | Co, Al | 0.8 | 20 | 180 | 0.14 |
| Comparative Example 2 | | | CoCO3 | Co | 1 | 18 | 160 | 0.17 |
| Comparative Example 3 | | | Al2O3 | Al | 1.5 | 26 | 260 | 0.19 |
| Comparative Example 4 | | | Carbon Black | None | 0.05 | 25 | 270 | 0.27 |

(1) fluorinated resin,
(2) bronze,
(3) a composite metal oxide containing cobalt and aluminum, and further containing at least one of metals selected from the group of chromium, titanium, magnesium, calcium, and lithium,
wherein the composite metal oxide has a mean particle diameter of from 0.1 μm to 10 μm both inclusive, and
wherein the composite metal oxide is added to the fluorinated resin at from 0.1 to 1.0 mass % both inclusive.

5. The sealing material described in claim 4, wherein the fluorinated resin is polytetrafluoroethylene.

6. The sealing material described in claim 4, wherein the sealing material is usable for construction machinery.

\* \* \* \* \*